United States Patent
Cao et al.

(10) Patent No.: US 12,261,796 B2
(45) Date of Patent: Mar. 25, 2025

(54) AIR-TO-GROUND COMMUNICATION SCHEDULING

(71) Applicant: QUALCOMM Incorporated, San Diego, CA (US)

(72) Inventors: Yiqing Cao, Beijing (CN); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/635,240

(22) PCT Filed: Aug. 16, 2019

(86) PCT No.: PCT/CN2019/101062
§ 371 (c)(1),
(2) Date: Feb. 14, 2022

(87) PCT Pub. No.: WO2021/030951
PCT Pub. Date: Feb. 25, 2021

(65) Prior Publication Data
US 2022/0278803 A1   Sep. 1, 2022

(51) Int. Cl.
*H04L 5/14* (2006.01)
*H04L 5/00* (2006.01)
*H04W 74/0833* (2024.01)

(52) U.S. Cl.
CPC .............. *H04L 5/0051* (2013.01); *H04L 5/14* (2013.01); *H04W 74/0833* (2013.01)

(58) Field of Classification Search
CPC .... H04L 5/0051; H04L 5/14; H04W 74/0833; H04W 72/51; H04W 56/0045
See application file for complete search history.

(56) References Cited

U.S. PATENT DOCUMENTS

| | | | |
|---|---|---|---|
| 9,357,468 B1* | 5/2016 | Talley | ................. H04W 36/324 |
| 2004/0264431 A1 | 12/2004 | Rhodes | |
| 2013/0109384 A1* | 5/2013 | Abe | ..................... H04W 72/541 |
| | | | 455/450 |
| 2015/0085840 A1* | 3/2015 | Liu | ........................ H04L 5/0055 |
| | | | 370/336 |

(Continued)

FOREIGN PATENT DOCUMENTS

| CN | 1617533 A | 5/2005 |
|---|---|---|
| CN | 108882368 A | 11/2018 |

(Continued)

OTHER PUBLICATIONS

International Search Report and Written Opinion—PCT/CN2019/101062—ISA/EPO—May 20, 2020.

*Primary Examiner* — Ayaz R Sheikh
*Assistant Examiner* — David Zhijun Sun
(74) *Attorney, Agent, or Firm* — Harrity & Harrity, LLP

(57) ABSTRACT

Various aspects of the present disclosure generally relate to wireless communication. In some aspects, a base station associated with a cell of a time division duplex communication system may determine a guard interval that is less than a maximum time delay, based at least in part on a radius of the cell, for air-to-ground communications; and transmit a scheduling configuration to a user equipment that identifies the guard interval. Numerous other aspects are provided.

35 Claims, 9 Drawing Sheets

(56) References Cited

U.S. PATENT DOCUMENTS

| | | | |
|---|---|---|---|
| 2015/0117270 A1* | 4/2015 | Um | H04W 72/0446 |
| | | | 370/278 |
| 2019/0141680 A1* | 5/2019 | Hu | H04W 72/0446 |
| 2019/0149269 A1* | 5/2019 | Chatterjee | H04L 5/0094 |
| | | | 370/329 |
| 2021/0360556 A1* | 11/2021 | Liu | H04B 7/18513 |

FOREIGN PATENT DOCUMENTS

| | | | | |
|---|---|---|---|---|
| WO | WO-2009012630 A1 | | 1/2009 | |
| WO | WO-2014209049 A1 * | 12/2014 | | H04L 5/0007 |
| WO | WO-2015042789 A1 | | 4/2015 | |
| WO | WO-2018170670 A1 * | 9/2018 | | |
| WO | WO-2019214395 A1 * | 11/2019 | | H04W 72/1257 |
| WO | WO-2020031155 A1 * | 2/2020 | | H04B 7/2125 |

* cited by examiner

AIR-TO-GROUND COMMUNICATION SCHEDULING

CROSS REFERENCE TO RELATED APPLICATION

This Patent Application is a 371 national stage of PCT Application PCT/CN2019/101062 filed on Aug. 16, 2019, entitled "AIR-TO-GROUND COMMUNICATION SCHEDULING," which is hereby expressly incorporated by reference herein.

FIELD OF THE DISCLOSURE

Aspects of the present disclosure generally relate to wireless communication and to techniques and apparatuses for air-to-ground (ATG) communication scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station associated with a cell of a time division duplex communication system, may include determining a guard interval that is less than a maximum time delay, based at least in part on a radius of the cell, for ATG communications; and transmitting a scheduling configuration to a UE that identifies the guard interval.

In some aspects, a method of wireless communication, performed by a UE of a time division duplex communication system, may include receiving a scheduling configuration that identifies a guard interval that is less than a maximum time delay, based at least in part on a radius of a cell in which the UE is located, for ATG communications; and transmitting or receiving communications according to the scheduling configuration.

In some aspects, a base station, associated with a cell of a time division duplex communication system, for wireless communication may include memory and one or more processors operatively coupled to the memory. The memory and the one or more processors may be configured to determine a guard interval that is less than a maximum time delay, based at least in part on a radius of the cell, for ATG communications; and transmit a scheduling configuration to a UE that identifies the guard interval.

In some aspects, a UE, of a time division duplex communication system, for wireless communication may include memory and one or more processors operatively coupled to the memory. The memory and the one or more processors may be configured to receive a scheduling configuration that identifies a guard interval that is less than a maximum time delay, based at least in part on a radius of a cell in which the UE is located, for ATG communications; and transmit or receive communications according to the scheduling configuration.

In some aspects, a non-transitory computer-readable medium may store one or more instructions for wireless communication. The one or more instructions, when executed by one or more processors of a base station, associated with a cell of a time division duplex communication system, may cause the one or more processors to determine a guard interval that is less than a maximum time delay, based at least in part on a radius of the cell, for ATG communications; and transmit a scheduling configuration to a UE that identifies the guard interval.

In some aspects, a non-transitory computer-readable medium may store one or more instructions for wireless communication. The one or more instructions, when executed by one or more processors of a UE, of a time division duplex communication system, may cause the one or more processors to receive a scheduling configuration that identifies a guard interval that is less than a maximum time delay, based at least in part on a radius of a cell in which the UE is located, for ATG communications; and transmit or receive communications according to the scheduling configuration.

In some aspects, an apparatus, associated with a cell of a time division duplex communication system, for wireless communication may include means for determining a guard interval that is less than a maximum time delay, based at least in part on a radius of the cell, for ATG communications; and means for transmitting a scheduling configuration to a UE that identifies the guard interval.

In some aspects, an apparatus, of a time division duplex communication system, for wireless communication may include means for receiving a scheduling configuration that identifies a guard interval that is less than a maximum time delay, based at least in part on a radius of a cell in which the apparatus is located, for ATG communications; and means for transmitting or receiving communications according to the scheduling configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
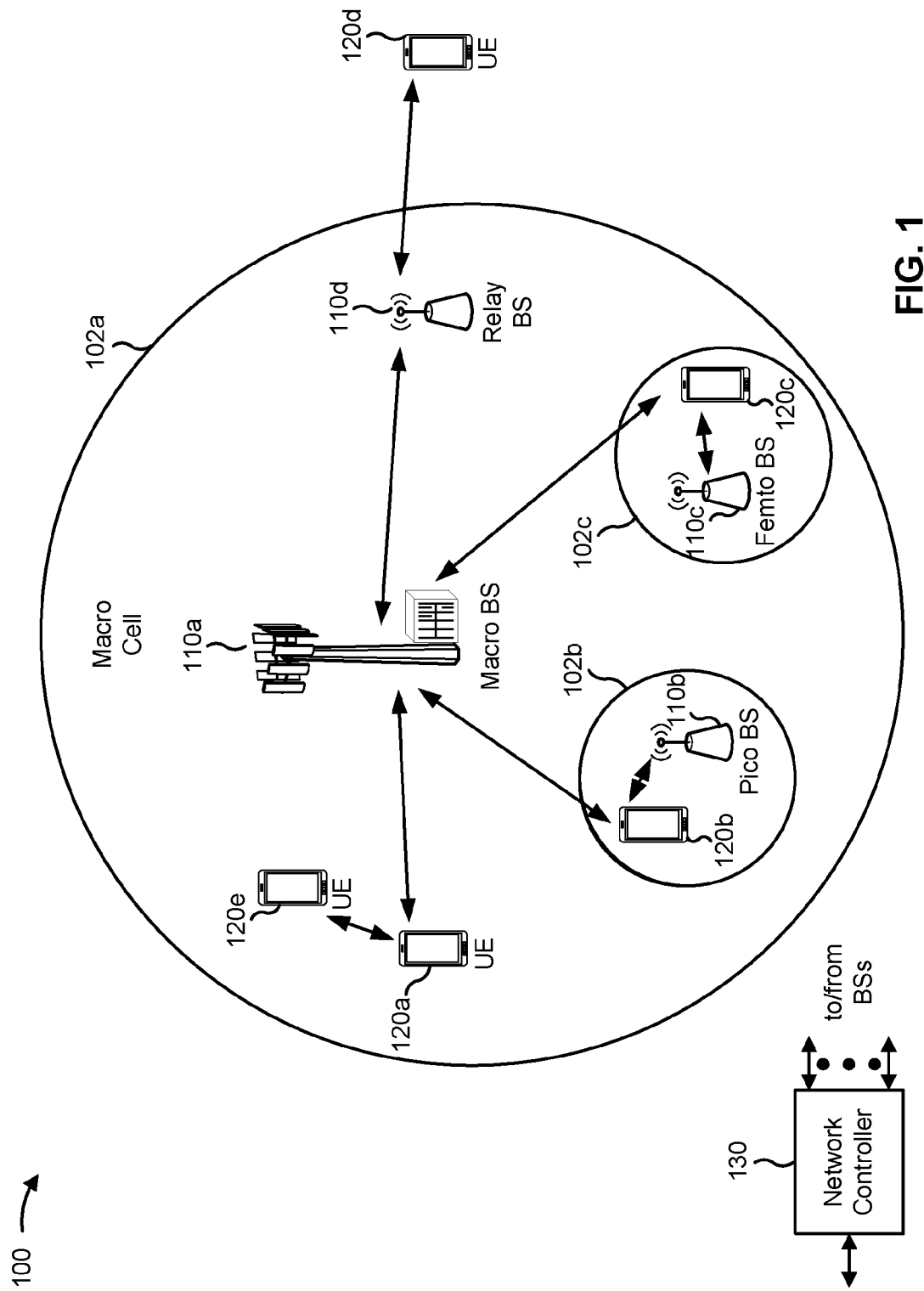
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
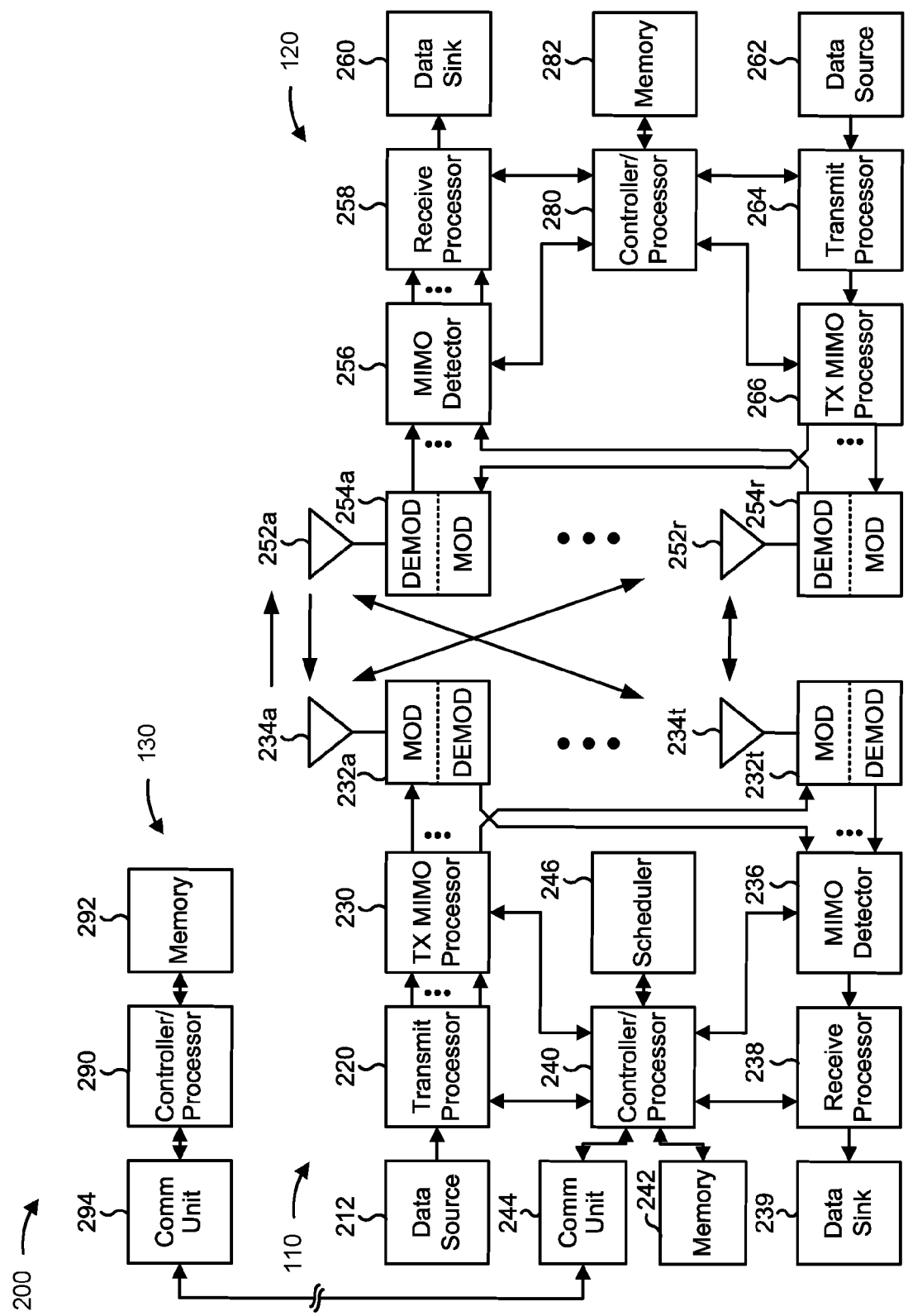
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with ATG communication scheduling, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving a scheduling configuration that identifies a guard interval that is less than a maximum time delay, based at least in part on a radius of a cell, for ATG communications, means for transmitting or receiving communications according to the scheduling configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a guard interval that is less than a maximum time delay, based at least in part on a radius of a cell, for ATG communications, means for transmitting a scheduling configuration to a UE that identifies the guard interval, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
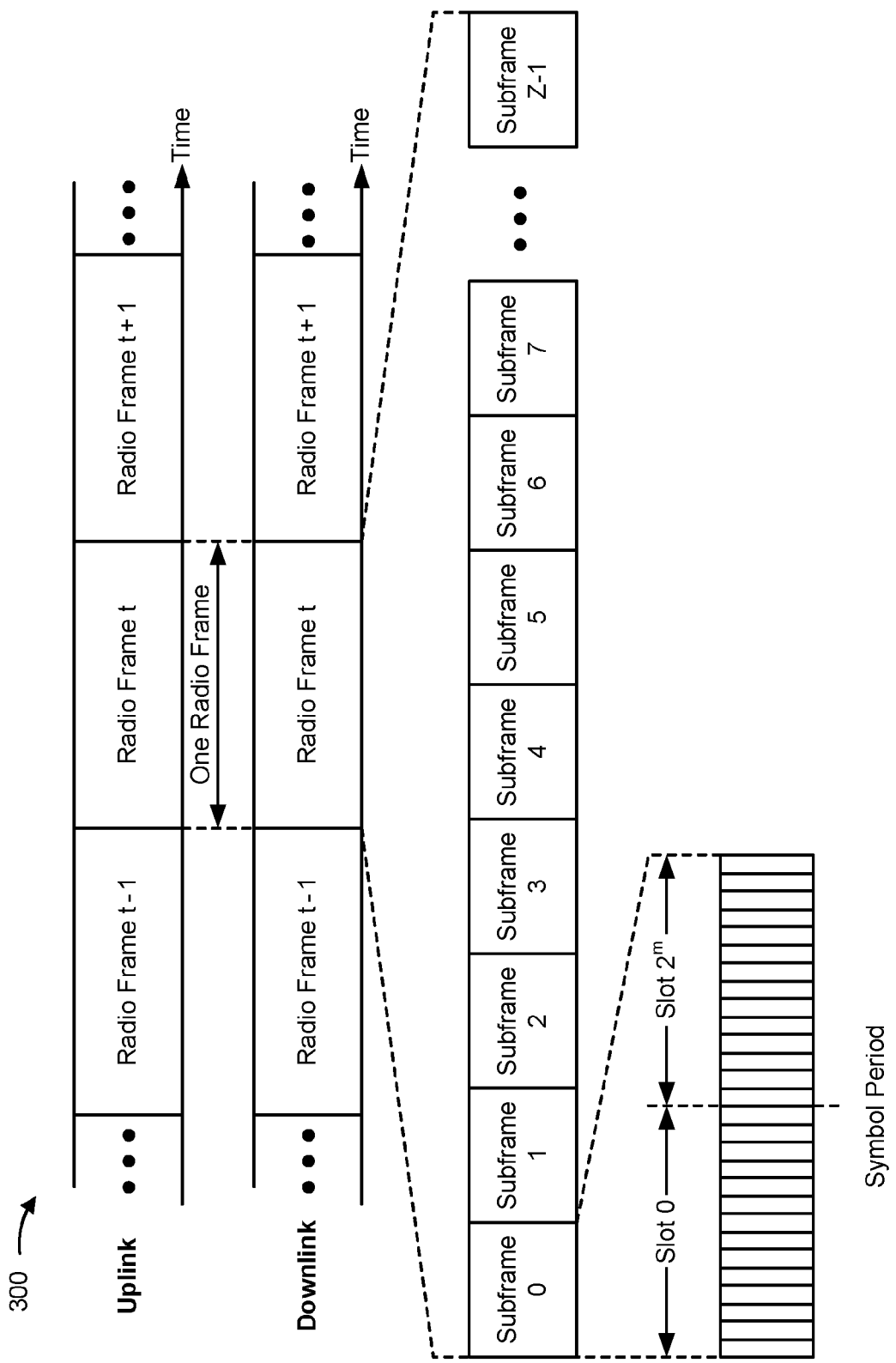
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

As indicated above, FIG. 3 is provided as an example. Other examples may differ from what is described with regard to FIG. 3.

Figure 4:
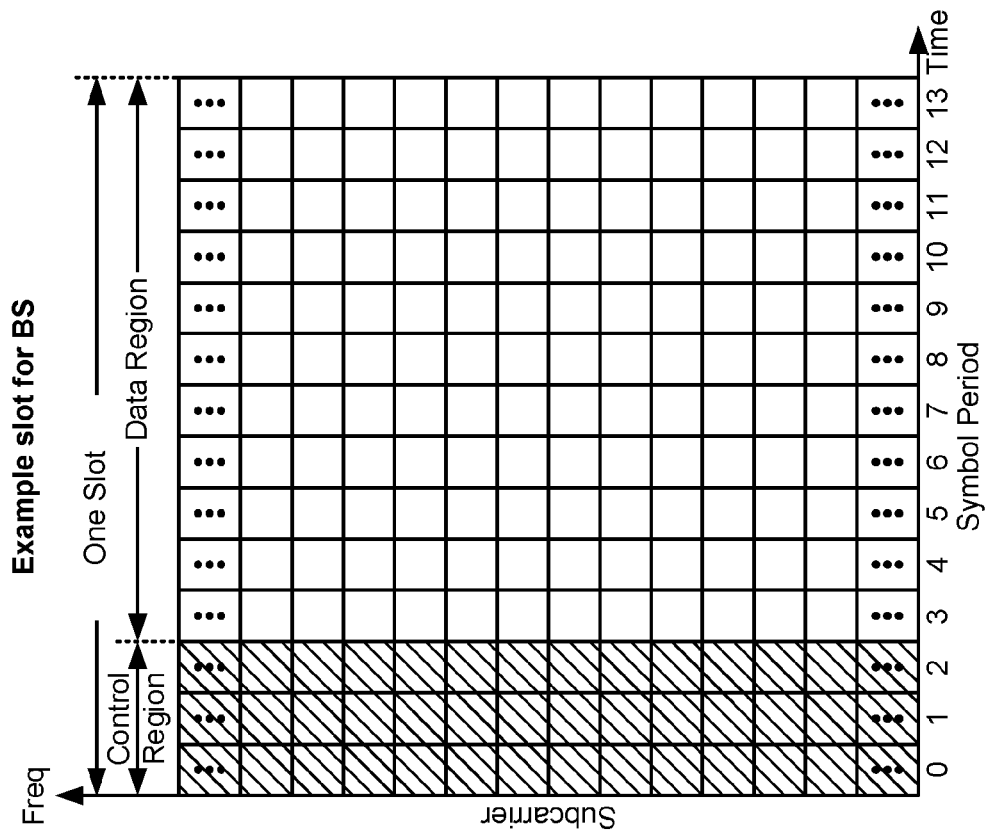
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
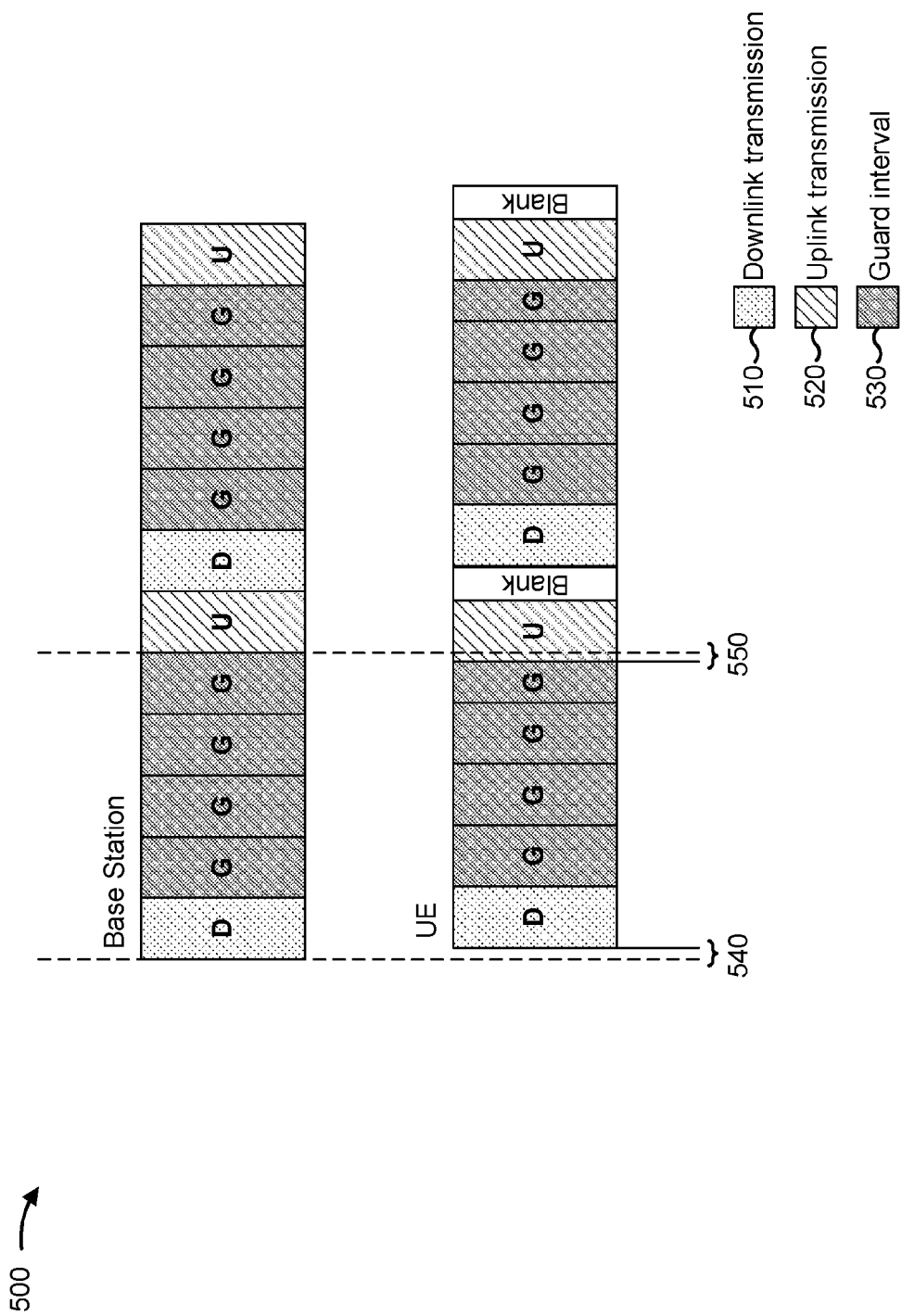
FIGS. 5-7 are diagrams illustrating examples of ATG communication scheduling, in accordance with various aspects of the present disclosure.

FIG. 5 is a diagram illustrating an example 500 of ATG communication scheduling, in accordance with various aspects of the present disclosure. As shown in FIG. 5, a base station and a UE may engage in ATG communications. In some aspects, the UE may receive downlink transmissions 510 from the base station and transmit uplink transmissions 520 to the base station according to a scheduling configuration provided by the base station. The scheduling configuration may identify a guard interval (which may also be referred to as a gap, a guard period, and/or various other suitable terms) 530. The guard interval 530 is a time separation that provides time for switch-over from downlink transmissions 510 (e.g., reception by the UE) to uplink transmissions 520 (e.g., transmission by the UE).

In current ATG communication systems, the guard interval 530 configured by the base station may be equal to, or greater than, a maximum round-trip delay in a cell that includes the base station. That is, the guard interval 530 may be equal to, or greater than, a round-trip delay between a UE at the cell's edge and the base station (e.g., 2×propagation time from a UE at the cell's edge to the base station). In ATG communication systems, a cell radius may be several hundred kilometers (e.g., 300 kilometers).

As shown in FIG. 5, the base station may configure a guard interval 530 of four slots to account for a maximum time delay (e.g., a maximum round-trip delay plus a round-trip downlink-uplink transition delay) of the cell (e.g., 300 kilometers). However, as shown in FIG. 5, a propagation delay 540 between the UE and the base station, and a corresponding timing advance (TA) 550, may be relatively short (e.g., when the UE is not at the cell's edge, such as 10 kilometers from the base station). For example, the TA 550 may only use one or more symbols of a slot configured as a guard interval 530. Accordingly, a guard interval 530 configured to be equal to, or greater than, a maximum time delay in the cell (e.g., four slots) reduces throughput when the UE is not at the cell's edge. Some techniques and apparatuses described herein use a guard interval that is less than the maximum time delay for ATG communications, thereby increasing downlink and/or uplink transmission opportunities and improving throughput.

As indicated above, FIG. 5 is provided as an example. Other examples may differ from what is described with respect to FIG. 5.

Figure 6:
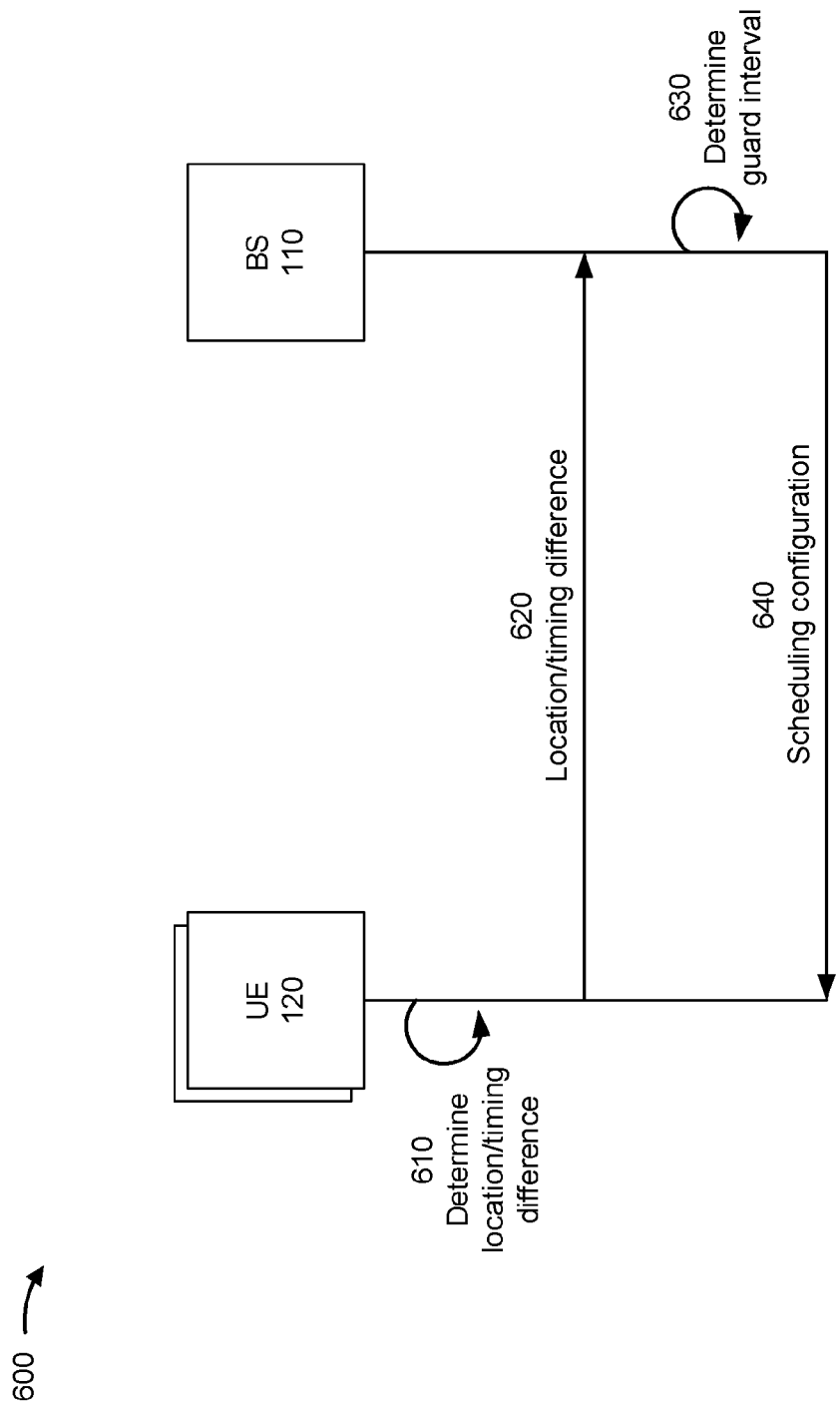

FIG. 6 is a diagram illustrating an example 600 of ATG communication scheduling, in accordance with various aspects of the present disclosure. As shown in FIG. 6, a base station 110 and multiple UEs 120 may engage in ATG communications. The base station 110 may be a terrestrial base station associated with a cell for ATG communication. For example, the cell may have a radius of one or several hundred kilometers (e.g., 100-500 kilometers). In some aspects, the base station 110 may communicate with the UEs 120 on a band that uses a time division duplex mode (e.g., NR band n79). The UEs 120 may be associated with non-terrestrial vehicles, such as airplanes, helicopters, dirigibles, and/or the like. In some aspects, a UE 120 may be equipped with at least one global positioning system (GPS) that provides the UE 120 with information identifying a location of the UE 120.

As shown in FIG. 6, and by reference number 610, the UE 120 may determine at least one of a location of the UE 120 or a timing difference (e.g., a propagation delay or a TA) for ATG communications with the base station 110. For example, the UE 120 may determine a location of the UE 120 based at least in part on data collected and provided by a GPS of the UE 120. Additionally, the UE 120 may determine a timing difference based on the location of the UE 120 and a location of the base station 110. The UE 120 may receive, from the base station 110, information identifying a location of the base station 110 upon entering a coverage area of the base station 110. In some aspects, the timing difference may be a TA (e.g., a round-trip delay (2×propagation delay) plus a round-trip downlink-to-uplink transition delay). The UE 120 may determine a TA having a slot granularity (e.g., the TA is one or more slots) or a symbol granularity (e.g., the TA is one or more symbols). In some aspects, the UE 120 may determine a TA having a symbol granularity according to a random access procedure with the base station 110.

As shown by reference number 620, the UE 120 may transmit, and the base station 110 may receive, at least one of information identifying a timing difference (e.g., a propagation delay or a TA) for the UE or information identifying a location of the UE. For example, the UE 120 may transmit the information identifying the timing difference or the location upon entering the cell associated with the base station 110. Moreover, the UE 120 may periodically transmit to the base station 110, while in the cell associated with the base station 110, at least one of information identifying a timing difference for the UE or information identifying a location of the UE. In some aspects, the base station 110 may receive respective information identifying a timing difference (e.g., a propagation delay or a TA) or a location from multiple UEs 120 in the cell associated with the base station 110.

As shown by reference number 630, the base station 110 may determine a guard interval for ATG communications with the multiple UEs 120. In some aspects, the base station 110 may determine a guard interval that is a fixed value based at least in part on a radius of the cell. For example, the base station 110 may determine a maximum time delay, based at least in part on the radius of the cell, for ATG communications in the cell. That is, the base station 110 may determine a maximum time delay between a UE 120 at the cell's edge (e.g., according to a radius of the cell) and the base station 110. In some aspects, the base station 110 may be configured with information that identifies a maximum time delay of the cell.

In some aspects, the maximum time delay may include a maximum round-trip delay for ATG communications in the cell, based at least in part on the radius of the cell, and a round-trip downlink-uplink transition delay (e.g., a downlink-to-uplink transition delay and an uplink-to-downlink transition delay). The maximum round-trip delay may be a round-trip delay between a UE 120 at the cell's edge (e.g., according to a radius of the cell) and the base station 110 (e.g., 2×propagation delay from a UE 120 at the cell's edge to the base station 110).

The base station 110 may determine a guard interval (e.g., a fixed value) that is less than the maximum time delay of the cell. In some aspects, the guard interval may be less than or equal to a minimum time delay of the cell for ATG communications in the cell. The minimum time delay may be based at least in part on a minimum altitude (e.g., a historical minimum altitude) of UEs 120 when directly above the base station 110. Additionally, or alternatively, the minimum time delay may be based at least in part on a closest location (e.g., a historical closest location) relative to the base station 110, or a smallest timing difference (e.g., a historical smallest timing difference) reported by UEs 120. In some aspects, the minimum time delay may include a minimum round-trip delay for ATG communications in the cell (e.g., based at least in part on the minimum altitude, the closest location, and/or the smallest timing difference) and a round-trip downlink-uplink transition delay. In some aspects, the guard interval (e.g., a fixed value) may correspond to a round-trip downlink-uplink transition delay (e.g., a downlink-to-uplink transition delay and an uplink-to-downlink transition delay).

In some aspects, the base station 110 may determine a guard interval according to a largest propagation delay in the cell. For example, the base station 110 may determine a guard interval that is greater than or equal to a time delay associated with a furthest UE 120 from the base station 110 (e.g., a furthest UE 120 attached to the cell). In some aspects, the time delay associated with the furthest UE 120 may include a round-trip delay for the furthest UE 120, based at least in part on a distance of the furthest UE 120 from the base station 110, and a round-trip downlink-uplink transition delay (e.g., a downlink-to-uplink transition delay and an uplink-to-downlink transition delay).

The base station 110 may determine the furthest UE 120 based at least in part on at least one of information identifying a location or information identifying a timing difference for each of the UEs 120 attached to the cell. For example, the base station 110 may determine the furthest UE 120 as a UE 120 that is reporting the largest timing difference (e.g., propagation delay or TA). Moreover, the base station 110 may determine the distance of the furthest UE 120 based at least in part on at least one of information identifying a location or information identifying a timing difference reported by the furthest UE 120. For example, the base station 110 may determine the distance based on the timing difference (e.g., propagation delay or TA) according to an assumption that transmissions from the UE will travel at the speed of light.

As the UEs 120 travel throughout the cell, the base station 110 may update the guard interval according to an updated time delay associated with a furthest UE 120 from the base station 110. For example, as the UEs 120 travel closer to the base station 110, the base station 110 may determine a shortened guard interval according to an updated time delay associated with a furthest UE 120 from the base station 110. Similarly, as the UEs 120 travel further from the base station 110, the base station 110 may determine a lengthened guard interval according to an updated time delay associated with a furthest UE 120 from the base station 110. The base station 110 may update the guard interval in accordance with periodic reports of information identifying a timing difference or a location received from multiple UEs 120 in the cell associated with the base station 110.

As shown by reference number 640, the base station 110 may transmit, and a UE 120 may receive, a scheduling configuration that identifies the guard interval. The base station 110 may transmit the scheduling configuration to the UE 120 via radio resource control (RRC) signaling or downlink control information (DCI). The scheduling configuration may identify the guard interval between an interval (e.g., a slot) assigned to a downlink transmission and an interval (e.g., a slot) assigned to an uplink transmission.

In some aspects, the scheduling configuration may identify a blank interval for the UE 120 in order to avoid interference with a downlink transmission of the base station 110. The base station 110 may determine a duration of the blank interval based at least in part on a timing difference or a location reported by the UE 120. For example, the base station 110 may determine a different (e.g., shorter) blank interval for a first UE 120 that is closer to the base station 110 (e.g., closer to a center of the cell) than a second UE 120 that is further from the base station 110 (e.g., further from the center of the cell).

In some aspects, the scheduling configuration may identify a timeline for at least one of a K0 timing, a K1 timing, or a K2 timing. A K0 timing refers to a timing between a downlink resource grant on a physical downlink control channel (PDCCH) and a downlink data transmission on a physical downlink shared channel (PDSCH). A K1 timing refers to a timing between a downlink data transmission on the PDSCH and an uplink acknowledgement (ACK) or negative ACK (HACK) on a physical uplink control channel (PUCCH). A K2 timing refers to a timing between an uplink resource grant on the PDCCH and an uplink data transmission on a physical uplink shared channel (PUSCH). The base station 110 may determine the timeline based at least in part on a timing difference or a location reported by the UE 120. Accordingly, the base station 110 may determine a different timeline for a first UE 120 that is closer to the base station 110 (e.g., closer to a center of the cell) than a second UE 120 that is further from the base station 110 (e.g., further from the center of the cell).

In some aspects, the scheduling configuration may identify a timeline for at least one of a K0 timing, a K1 timing, or a K2 timing that is not adjusted according to a timing difference or a location reported by the UE 120. In such a case, the UE 120 may adjust one or more of the K0 timing, the K1 timing, or the K2 timing based at least in part on the timing difference for the UE 120 or the location of the UE 120. For example, the UE 120 may determine an adjusted K1 timing by reducing the K1 timing by a round-trip delay (e.g., 2×propagation delay) of the UE 120 or may determine an adjusted K2 timing by reducing the K2 timing by the round-trip delay of the UE 120.

The UE 120 may transmit uplink transmissions to the base station 110, or receive downlink transmissions from the base station 110, according to the scheduling configuration.

As indicated above, FIG. 6 is provided as an example. Other examples may differ from what is described with respect to FIG. 6.

Figure 7:
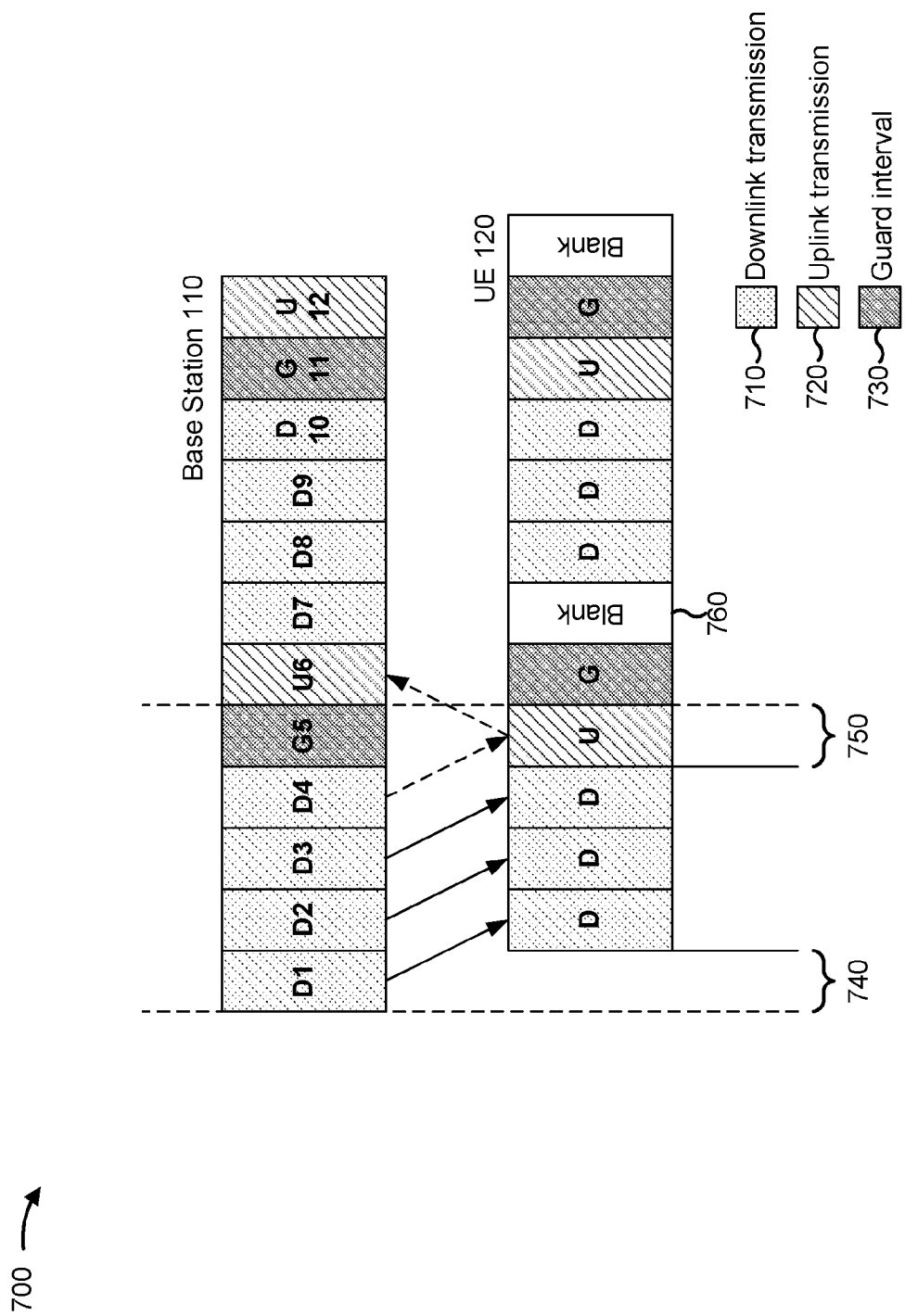

FIG. 7 is a diagram illustrating an example 700 of ATG communication scheduling, in accordance with various aspects of the present disclosure. As shown in FIG. 7, a base station 110 and a UE 120 may engage in ATG communications. In some aspects, the UE 120 may receive downlink transmissions 710 from the base station 110 and transmit uplink transmissions 720 to the base station 110 according to a scheduling configuration provided by the base station 110, as described in more detail above in connection with FIG. 6. As shown in FIG. 7, example 700 may relate to a guard interval 730 determined by the base station 110 (as described in more detail above in connection with FIG. 6) that is equal to a TA 750 of the UE 120 (e.g., the guard interval 730 may be equal to the TA 750 when the UE 120 is 150 kilometers from the base station 110). In some aspects, the guard interval 730 may be less than a TA 750 of the UE 120 (e.g., when the UE 120 is greater than 150 kilometers from the base station 110). For example, the guard interval may be less than, or equal to, a TA of the UE 120 when the guard interval is a fixed value (e.g., a fixed value based at least in part on a minimum time delay of the cell, such as a minimum time delay based on a distance that is less than 150 km).

In such cases, the base station 110 may determine, based at least in part on a timing difference (e.g., a propagation delay 740 or a TA 750) or a location reported by a UE 120, a downlink transmission 710 that is to collide with an uplink transmission 720 of the UE 120. For example, based at least in part on a timing difference or a location reported by the UE 120 and a duration of the guard interval 730, the base station 110 may determine that an uplink transmission 720 of the UE 120 will be transmitted in an interval (e.g., a slot) scheduled for a downlink transmission 710 of the base station 110. As shown in FIG. 7, an uplink transmission 720 according to TA 750 may collide with a downlink transmission (D4) 710.

In some aspects, the base station 110 may schedule the downlink transmission 710 and/or the uplink transmission 720 so as to avoid a collision. For example, based at least in part on a timing difference (e.g., a propagation delay 740 or a TA 750) or a location reported by the UE 120, the base station 110 may determine an interval in which a collision is to occur (e.g., slot D4), and schedule the downlink transmission 710 in a different interval (e.g., a different slot). In some aspects, such as when a collision is to occur, the UE 120 may skip the downlink transmission 710 (e.g., according to a scheduling indication provided by the base station 110) in order to transmit the uplink transmission 720. In such a case, the base station 110 may provide uplink grants in one or more downlink transmissions 710 that the UE 120 is not to skip (e.g., based on the timing difference or the location).

In some aspects, such as when a collision is to occur, the UE 120 may delay an uplink transmission 720 to an available (e.g., non-colliding) interval (e.g., an available slot). Alternatively, the UE 120 may drop the uplink transmission 720, and the base station 110 may subsequently schedule the dropped uplink transmission 720.

In some aspects, such as when a collision is to occur, the base station 110 may transmit (e.g., via DCI) an indication that the UE 120 is to receive the downlink transmission 710. For example, the base station 110 may transmit the indication based at least in part on a determination that a downlink transmission 710 is not being scheduled in the interval (e.g., slot D4). Additionally, or alternatively, the UE 120 may determine to receive the downlink transmission 710 based at least in part on a determination that an uplink grant for the interval (e.g., slot D4) was not received from the base station 110.

In some aspects, the base station 110 may schedule a blank interval 760 (e.g., one or more symbols or one or more slots) for the UE 120 in order to avoid interference with a downlink transmission 710 of the base station 110. The base station 110 may determine a duration of the blank interval 760 based at least in part on a timing difference (e.g., a propagation delay 740 or TA 750) or a location reported by the UE 120. For example, the base station 110 may determine a different (e.g., shorter) blank interval 760 for a first UE 120 that is closer to the base station 110 (e.g., closer to a center of the cell) than a second UE 120 that is further from the base station 110 (e.g., further from the center of the cell).

In some aspects, when a collision is to occur, an uplink transmission 720 may be given a higher priority than a downlink transmission 710. For example, the UE 120 may transmit an uplink transmission according to an uplink grant scheduled by DCI (e.g., dynamically scheduled) when the uplink transmission conflicts with a configured downlink transmission (e.g., by an RRC configuration), a semi-static scheduled uplink transmission, a semi-static scheduled downlink transmission, and/or the like. As another example, the UE 120 may transmit an uplink transmission, associated with a sounding reference signal, a random access procedure, and/or another essential signal, that conflicts with a configured downlink transmission. In some aspects, the UE 120 may receive a downlink transmission, associated with discontinuous reception scheduling, a control resource set (CORESET, e.g., CORESET #0), a synchronization signal block, or other essential information, that conflicts with a configured uplink transmission.

Moreover, in some aspects, TAs 750 of the UE 120 for downlink scheduling and uplink scheduling may be according to different time intervals. For example, the UE 120 may use a TA 750 of one or more slots for downlink scheduling that is per slot, and the UE 120 may use a TA 750 of one or more symbols for uplink scheduling that is per symbol. In some aspects, the UE 120 may determine a TA 750 that is one or more symbols according to a random access procedure with the base station 110.

As indicated above, FIG. 7 is provided as an example. Other examples may differ from what is described with respect to FIG. 7.

Figure 8:
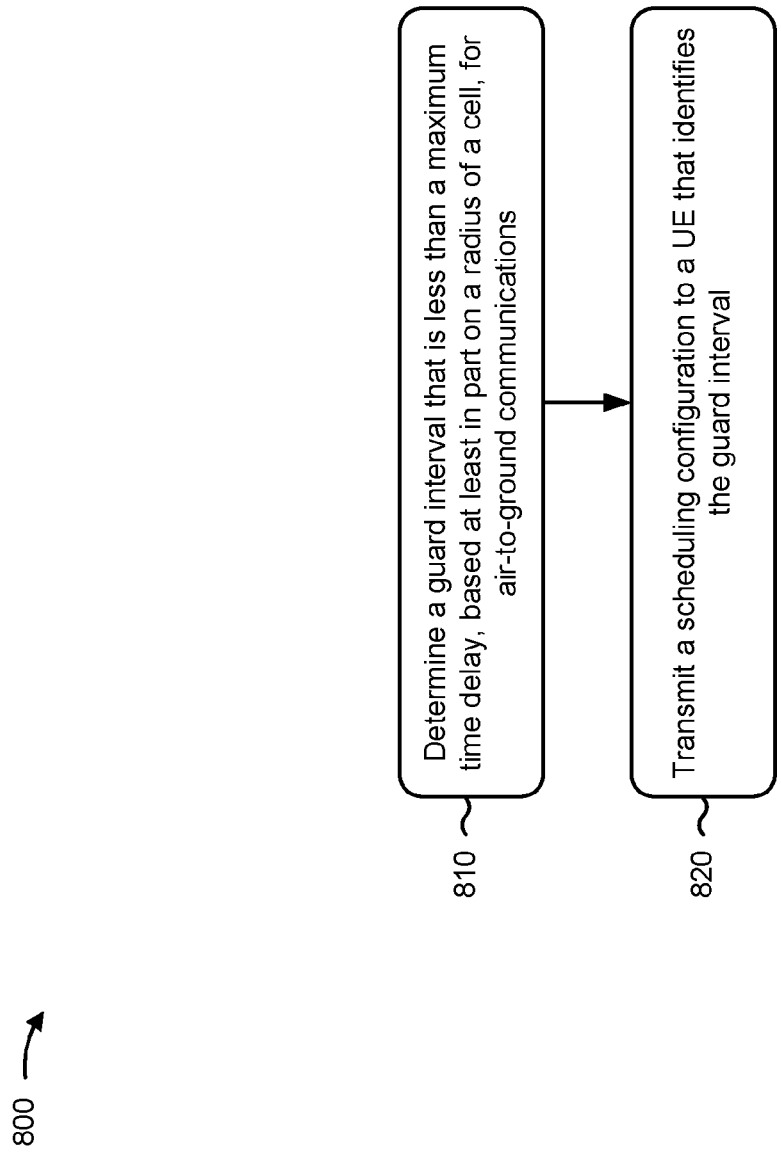
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where a base station (e.g., base station 110 and/or the like) performs operations associated with ATG communication scheduling.

As shown in FIG. 8, in some aspects, process 800 may include determining a guard interval that is less than a maximum time delay, based at least in part on a radius of a cell, for ATG communications (block 810). For example, the base station (e.g., using controller/processor 240 and/or the like) may determine a guard interval that is less than a maximum time delay, based at least in part on a radius of a cell, for ATG communications, as described above.

As further shown in FIG. 8, in some aspects, process 800 may include transmitting a scheduling configuration to a UE that identifies the guard interval (block 820). For example, the base station (e.g., using controller/processor 240, transmit processor 220, TX MIMO processor 230, MOD 232, antenna 234, and/or the like) may transmit a scheduling configuration to a UE that identifies the guard interval, as described above.

Process 800 may include additional aspects, such as any single aspect or any combination of aspects described below and/or in connection with one or more other processes described elsewhere herein.

In a first aspect, the maximum time delay includes a maximum round-trip delay, based at least in part on the radius of the cell, and a round-trip downlink-uplink transition delay of the UE.

In a second aspect, alone or in combination with the first aspect, process 800 further includes receiving information identifying a timing difference for the UE or information identifying a location of the UE. In a third aspect, alone or in combination with one or more of the first and second aspects, the scheduling configuration identifies a timeline that is based at least in part on the timing difference or the location, and the timeline is for at least one of a K0 timing, a K1 timing, or a K2 timing. In a fourth aspect, alone or in combination with one or more of the first through third aspects, the scheduling configuration identifies a blank interval based at least in part on the timing difference or the location.

In a fifth aspect, alone or in combination with one or more of the first through fourth aspects, process 800 further includes determining, based at least in part on the timing difference or the location, a downlink transmission that is to collide with an uplink transmission of the UE. In a sixth aspect, alone or in combination with one or more of the first through fifth aspects, process 800 further includes scheduling the downlink transmission so as to avoid a collision with the uplink transmission. In a seventh aspect, alone or in combination with one or more of the first through sixth aspects, process 800 further includes transmitting, based at least in part on a determination that the uplink transmission is not being scheduled, an indication that the UE is to receive the downlink transmission. In an eighth aspect, alone or in combination with one or more of the first through seventh aspects, process 800 further includes scheduling the uplink transmission and not scheduling the downlink transmission.

In a ninth aspect, alone or in combination with one or more of the first through eighth aspects, the timing difference is a timing advance or a propagation delay. In a tenth aspect, alone or in combination with one or more of the first through ninth aspects, the timing advance is one or more slots or one or more symbols.

In an eleventh aspect, alone or in combination with one or more of the first through tenth aspects, the guard interval is greater than or equal to a time delay associated with a furthest UE from the base station, and the furthest UE is attached to the cell. In a twelfth aspect, alone or in combination with one or more of the first through eleventh aspects, the time delay includes a round-trip delay, based at least in part on a distance of the furthest UE from the base station, and a round-trip downlink-uplink transition delay of the furthest UE. In a thirteenth aspect, alone or in combination with one or more of the first through twelfth aspects, process 800 further includes receiving at least one of information identifying a timing difference or information identifying a location from each of a plurality of UEs in the cell, and determining the furthest UE based at least in part on at least one of the information identifying the timing difference or the information identifying the location. In a fourteenth aspect, alone or in combination with one or more of the first through thirteenth aspects, process 800 further includes transmitting an updated scheduling configuration that identifies a shortened guard interval based at least in part on an updated timing difference or an updated location of the furthest UE from the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
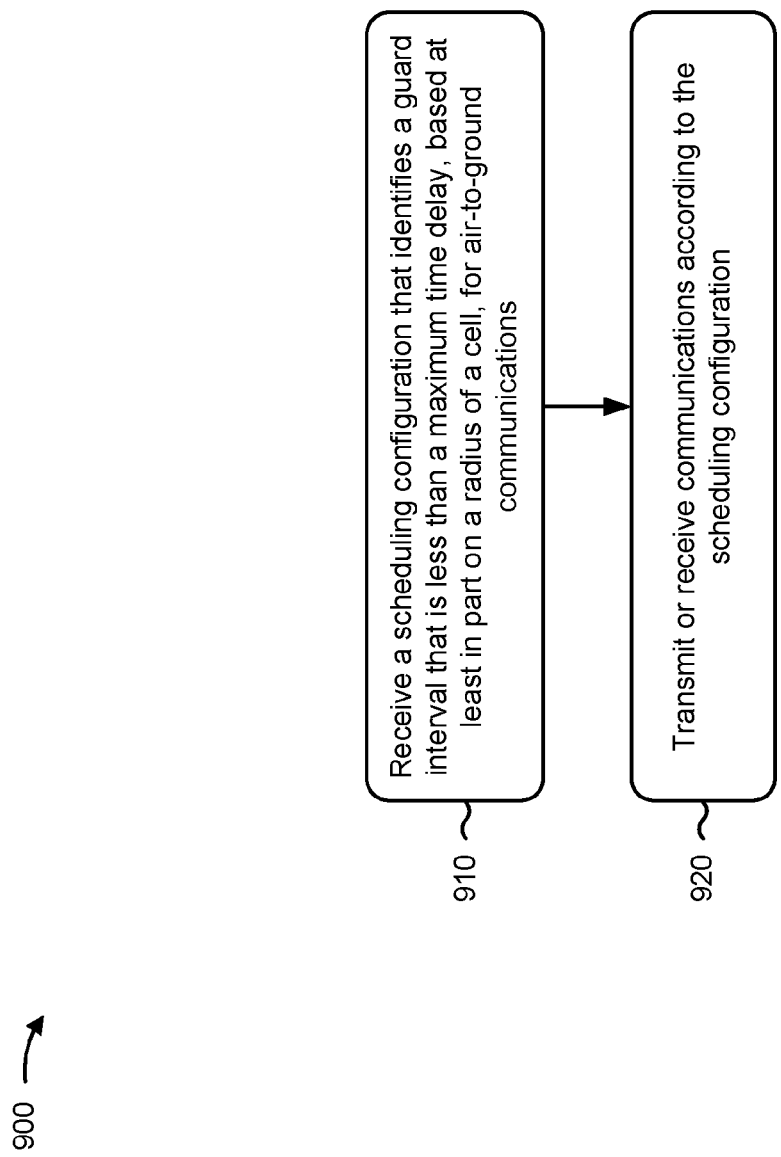
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with ATG communication scheduling.

As shown in FIG. 9, in some aspects, process 900 may include receiving a scheduling configuration that identifies a guard interval that is less than a maximum time delay, based at least in part on a radius of a cell, for ATG communications (block 910). For example, the UE (e.g., using antenna 252, DEMOD 254, MIMO detector 256, receive processor 258, controller/processor 280, and/or the like) may receive a scheduling configuration that identifies a guard interval that is less than a maximum time delay, based at least in part on a radius of a cell, for ATG communications, as described above.

As further shown in FIG. 9, in some aspects, process 900 may include transmitting or receiving communications according to the scheduling configuration (block 920). For example, the UE (e.g., using transmit processor 220, TX MIMO processor 230, MOD 232, antenna 234 antenna 252, DEMOD 254, MIMO detector 256, receive processor 258, controller/processor 280, and/or the like) may transmit or receive communications according to the scheduling configuration, as described above.

Process 900 may include additional aspects, such as any single aspect or any combination of aspects described below and/or in connection with one or more other processes described elsewhere herein.

In a first aspect, the maximum time delay includes a maximum round-trip delay, based at least in part on the radius of the cell, and a round-trip downlink-uplink transition delay of the UE.

In a second aspect, alone or in combination with the first aspect, process 900 further includes receiving a timeline for at least one of a K1 timing or a K2 timing, and determining at least one of an adjusted K1 timing by reducing the K1 timing by a round-trip delay of the UE or an adjusted K2 timing by reducing the K2 timing by the round-trip delay of the UE.

In a third aspect, alone or in combination with one or more of the first and second aspects, process 900 further includes transmitting information identifying a timing difference for the UE or information identifying a location of the UE. In a fourth aspect, alone or in combination with one or more of the first through third aspects, the scheduling configuration identifies a timeline that is based at least in part on the timing difference or the location, and the timeline is for at least one of a K0 timing, a K1 timing, or a K2 timing. In a fifth aspect, alone or in combination with one or more of the first through fourth aspects, the scheduling configuration identifies a blank interval based at least in part on the timing difference or the location.

In a sixth aspect, alone or in combination with one or more of the first through fifth aspects, process 900 further includes receiving a downlink transmission in an interval that is to be used for an uplink transmission, based at least in part on the timing difference and an indication that the uplink transmission is not being scheduled. In a seventh aspect, alone or in combination with one or more of the first through sixth aspects, process 900 further includes transmitting an uplink transmission in accordance with the timing difference and in an interval assigned to a downlink transmission.

In an eighth aspect, alone or in combination with one or more of the first through seventh aspects, the timing difference is a timing advance or a propagation delay. In a ninth aspect, alone or in combination with one or more of the first through eighth aspects, the timing advance is one or more slots or one or more symbols. In a tenth aspect, alone or in combination with one or more of the first through ninth aspects, the timing advance is the one or more slots and is determined based on a random access procedure.

In an eleventh aspect, alone or in combination with one or more of the first through tenth aspects, the guard interval is greater than or equal to a time delay associated with a furthest UE from a base station serving the UE, and the furthest UE is attached to the cell. In a twelfth aspect, alone or in combination with one or more of the first through eleventh aspects, the time delay includes a round-trip delay, based at least in part on a distance of the furthest UE from the base station, and a round-trip downlink-uplink transition delay of the furthest UE. In a thirteenth aspect, alone or in combination with one or more of the first through twelfth aspects, process 900 further includes receiving an updated scheduling configuration that identifies a shortened guard interval that is based at least in part on an updated timing difference or an updated location of the furthest UE from the base station.

In a fourteenth aspect, alone or in combination with one or more of the first through thirteenth aspects, process 900 further includes transmitting an uplink transmission according to a dynamically scheduled uplink grant when the uplink transmission conflicts with a configured downlink transmission or a semi-static scheduled downlink transmission. In a fifteenth aspect, alone or in combination with one or more of the first through fourteenth aspects, process 900 further includes transmitting an uplink transmission, associated with a sounding reference signal or a random access procedure, that conflicts with a configured downlink transmission. In a sixteenth aspect, alone or in combination with one or more of the first through fifteenth aspects, process 900 further includes receiving a downlink transmission, associated with discontinuous reception scheduling, a control resource set, or a synchronization signal block, that conflicts with a configured uplink transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station associated with a cell of a time division duplex communication system, comprising:
   determining a guard interval associated with air-to-ground communications with multiple user equipments (UEs), wherein the guard interval is:
      less than a maximum time delay, for air-to-ground communications in the cell, that is based at least in part on a radius of the cell, and
      greater than or equal to a time delay associated with a furthest UE associated with the base station; and
   transmitting a scheduling configuration to a UE, of the multiple UEs, that identifies the guard interval.

2. The method of claim 1, wherein the maximum time delay includes a maximum round-trip delay, based at least in part on the radius of the cell, and a round-trip downlink-uplink transition delay of the UE.

3. The method of claim 1, further comprising receiving information identifying a timing difference for the UE or information identifying a location of the UE.

4. The method of claim 3, wherein the scheduling configuration identifies a timeline that is based at least in part on the timing difference or the location, wherein the timeline is for at least one of a K0 timing, a K1 timing, or a K2 timing.

5. The method of claim 3, wherein the scheduling configuration identifies a blank interval based at least in part on the timing difference or the location.

6. The method of claim 3, further comprising determining, based at least in part on the timing difference or the location, a downlink transmission that is to collide with an uplink transmission of the UE.

7. The method of claim 6, further comprising scheduling the downlink transmission so as to avoid a collision with the uplink transmission.

8. The method of claim 6, further comprising transmitting, based at least in part on a determination that the uplink transmission is not being scheduled, an indication that the UE is to receive the downlink transmission.

9. The method of claim 6, further comprising scheduling the uplink transmission and not scheduling the downlink transmission.

10. The method of claim 3, wherein the timing difference is a timing advance or a propagation delay.

11. The method of claim 1, wherein the furthest UE is attached to the cell.

12. The method of claim 1, wherein the time delay includes a round-trip delay, based at least in part on a distance of the furthest UE, and a round-trip downlink-uplink transition delay of the furthest UE.

13. The method of claim 1, further comprising receiving at least one of information identifying a timing difference or information identifying a location from each of a plurality of UEs in the cell; and
   determining the furthest UE based at least in part on at least one of the information identifying the timing difference or the information identifying the location.

14. The method of claim 1, further comprising transmitting an updated scheduling configuration that identifies a shortened guard interval based at least in part on an updated timing difference or an updated location of the furthest UE.

15. A method of wireless communication performed by a user equipment (UE) of a time division duplex communication system, comprising:
   receiving a scheduling configuration that identifies a guard interval associated with air-to-ground communications with multiple UEs, wherein the guard interval is:
      less than a maximum time delay for air-to-ground communications in a cell in which the UE is located, that is based at least in part on a radius of the cell, and
      greater than or equal to a time delay associated with a furthest UE associated with a base station of the cell; and
   transmitting or receiving communications according to the scheduling configuration.

16. The method of claim 15, wherein the maximum time delay includes a maximum round-trip delay, based at least in part on the radius of the cell, and a round-trip downlink-uplink transition delay of the UE.

17. The method of claim 15, further comprising receiving a timeline for at least one of a K1 timing or a K2 timing; and
   determining at least one of an adjusted K1 timing by reducing the K1 timing by a round-trip delay of the UE or an adjusted K2 timing by reducing the K2 timing by the round-trip delay of the UE.

18. The method of claim 15, further comprising transmitting information identifying a timing difference for the UE or information identifying a location of the UE.

19. The method of claim 18, wherein the scheduling configuration identifies a timeline that is based at least in part on the timing difference or the location,
wherein the timeline is for at least one of a K0 timing, a K1 timing, or a K2 timing.

20. The method of claim 18, wherein the scheduling configuration identifies a blank interval based at least in part on the timing difference or the location.

21. The method of claim 18, further comprising receiving a downlink transmission in an interval that is to be used for an uplink transmission, based at least in part on the timing difference and an indication that the uplink transmission is not being scheduled.

22. The method of claim 18, further comprising transmitting an uplink transmission in accordance with the timing difference and in an interval assigned to a downlink transmission.

23. The method of claim 18, wherein the timing difference is a timing advance or a propagation delay.

24. The method of claim 23, wherein the timing advance is one or more slots or one or more symbols.

25. The method of claim 24, wherein the timing advance is the one or more slots and is determined based on a random access procedure.

26. The method of claim 15, wherein the furthest UE is attached to the cell.

27. The method of claim 15, wherein the time delay includes a round-trip delay, based at least in part on a distance of the furthest UE, and a round-trip downlink-uplink transition delay of the furthest UE.

28. The method of claim 15, further comprising receiving an updated scheduling configuration that identifies a shortened guard interval that is based at least in part on an updated timing difference or an updated location of the furthest UE from the base station.

29. The method of claim 15, further comprising transmitting an uplink transmission according to a dynamically scheduled uplink grant when the uplink transmission conflicts with a configured downlink transmission or a semi-static scheduled downlink transmission.

30. The method of claim 15, further comprising transmitting an uplink transmission, associated with a sounding reference signal or a random access procedure, that conflicts with a configured downlink transmission.

31. The method of claim 15, further comprising receiving a downlink transmission, associated with discontinuous reception scheduling, a control resource set, or a synchronization signal block, that conflicts with a configured uplink transmission.

32. A user equipment (UE), of a time division duplex communication system, for wireless communication, comprising:
a memory; and
one or more processors operatively coupled to the memory, the memory and the one or more processors configured to:
receive a scheduling configuration that identifies a guard interval associated with air-to-ground communications with multiple UEs, wherein the guard interval is:
less than a maximum time delay, for air-to-ground communications in a cell in which the UE is located, that is based at least in part on a radius of the cell, and
greater than or equal to a time delay associated with a furthest UE associated with a base station of the cell; and
transmit or receive communications according to the scheduling configuration.

33. The UE of claim 32, wherein the memory and the one or more processors are
further configured to transmit information identifying a timing difference for the UE or information identifying a location of the UE.

34. The UE of claim 33, wherein the memory and the one or more processors are further configured to receive a downlink transmission in an interval that is to be used for an uplink transmission, based at least in part on the timing difference and an indication that the uplink transmission is not being scheduled.

35. An apparatus, associated with a cell of a time division duplex communication system, for wireless communication, comprising:
means for determining a guard interval associated with air-to-ground communications with multiple user equipments (UEs), wherein the guard interval is:
less than a maximum time delay, for air-to-ground communications in the cell, that is based at least in part on a radius of the cell, and
greater than or equal to a time delay associated with a furthest UE associated with the apparatus; and
means for transmitting a scheduling configuration to a UE, of the multiple UEs, that identifies the guard interval.

* * * * *